Figure 1:
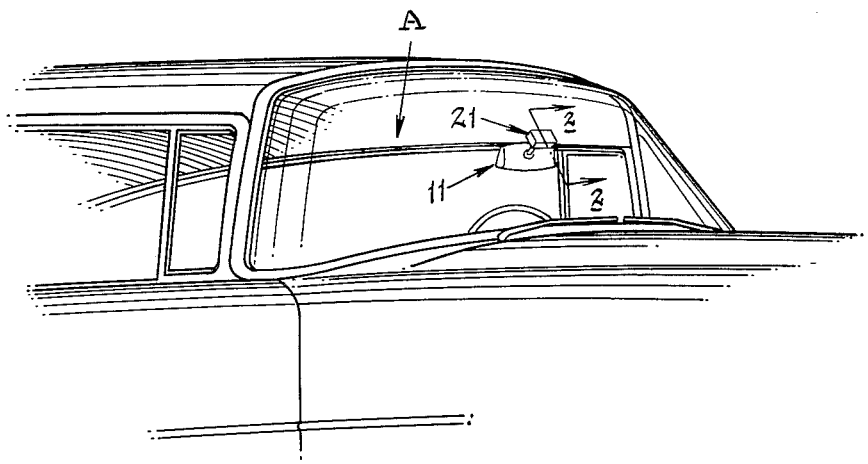

Jan. 25, 1966  P. T. MATTIMOE ETAL  3,231,440
METHOD OF LAMINATING GLASS
Filed July 17, 1958

INVENTORS
Paul P. Mattimoe and
BY William L. Elton
Nobbe & Swope
ATTORNEYS

United States Patent Office 3,231,440
Patented Jan. 25, 1966

3,231,440
METHOD OF LAMINATING GLASS
Paul T. Mattimoe, Toledo, and William L. Elton, Maumee, Ohio, assignors to Libbey-Owens-Ford Glass Company, Toledo, Ohio, a corporation of Ohio
Filed July 17, 1958, Ser. No. 749,244
3 Claims. (Cl. 156—103)

The present invention relates broadly to a method of bonding a plastic material to a surface of a substantially solid support body and is more particularly directed to a novel method of attaching a supporting member or block, adapted to support an automobile rear view mirror, to the interior surface of a glass windshield of an automobile.

The panoramic or "wrap-around" windshields employed in most present-day automobiles have typified the advance design of the modern cars. However, more recent styling has brought about an upward extension of the windshield to a smooth curve and to blend the windshield into the roof curvature of the car body. This is done so that the windshield more generally conforms to the styling of the automobile body and forms a windshield most aptly described as a "cap" windshield. In addition, present body design has reduced the car height so that the roof is positioned closer to the level of the road than heretofore.

These considerations have accentuated the critical importance of the mounting position of the rear view mirror within the automobile interior. By replacing the conventional metal roof area, from which the mirror has heretofore been mounted, with a glass area (i.e. the cap windshield), the present mirror mounting brackets and fixtures were found to be of limited value.

If a conventional mirror mounting arm were fastened to the metal roof area and bent so that its extremity was located in a position where the rear view mirror would be mounted in substantially the same position as it is presently mounted, serious disadvantages would arise. One of these disadvantages would be that such a mounting arm would project into the car interior, over the driver's head, and limit the available free and unobstructed head room in the car. This would introduce an undesirable and unsafe structural feature which might lead to possible injury to a passenger who might be thrown upwardly against such a mounting arm. Likewise, an extended mounting arm would magnify the normal car vibrations and introduce into the rear view mirror a vibration sufficient to distort the reflective image visible to the driver.

On the other hand, mounting of the rear view mirror on the automobile dashboard has proven to be unsatisfactory because the viewing of rear road conditions is sharply limited when a third occupant rides in the front seat of the car.

Generally speaking, a rear view mirror must be mounted in a position and in such a manner that the operator of the vehicle will have an unobstructed and unimpaired field of vision through his line of sight to the mirror and through the rear window of the vehicle. The operator must also be able to view clearly the maximum possible area behind the car, as reflected by the rear view mirror, and the mirror must be firmly mounted so that the mounting is unaffected by either handling or operational use. Further, the mounting must resist atmospheric or climatic conditions, particularly heat, cold and dampness. This necessity for a firm mounting to resist handling is of great importance, particularly since adequate rearward observation must be optionally selective so that a correct mirror position, in the line of sight of the operator, may be assured for any person driving the car. Such viewing requirements vary, for example, due to variations in height and seating position of the driver.

Additionally, it is necessary that the rear view mirror be fixedly mounted to resist vibrations, tensions and stresses developed by normal car operation in such a manner that it will provide adequate rear vision and afford maximum safety to the vehicle operator.

A primary object of the present invention therefore is to provide a novel method of bonding a substantially solid mounting member to a glass surface.

Another object of the invention is to provide a novel method of bonding a substantially solid member to a glass windshield in a manner that a durable, substantially rigid bond is provided which will be particularly resistant to all climatic conditions.

Another object of the invention is to provide a novel method of bonding a rear view mirror support member to the interior surface of a windshield which will substantially rigidly secure the mirror to the windshield to resist the normal car vibrations.

A further object of the invention is to provide a novel method of bonding a rear view mirror mounting member to the interior surface of a glass windshield by the use of a layer of polyvinyl butyral resin coated with a high boiling phosphate ester plasticizer and wherein the resultant bond between the mounting member and the windshield will be unaffected by heat, cold or moisture.

A still further object of the invention is to provide a novel bond between a rear view mirror mounting and the interior surface of a glass windshield that will position the mirror for proper viewing and which will also resist tensions normally introduced by adjustment of the mirror to alter the reflected field of view, without affecting the structural strength of the mirror mounting.

Other objects and advantages of the invention will become more apparent during the course of the following description when taken in connection with the accompanying drawings.

Figure 2:
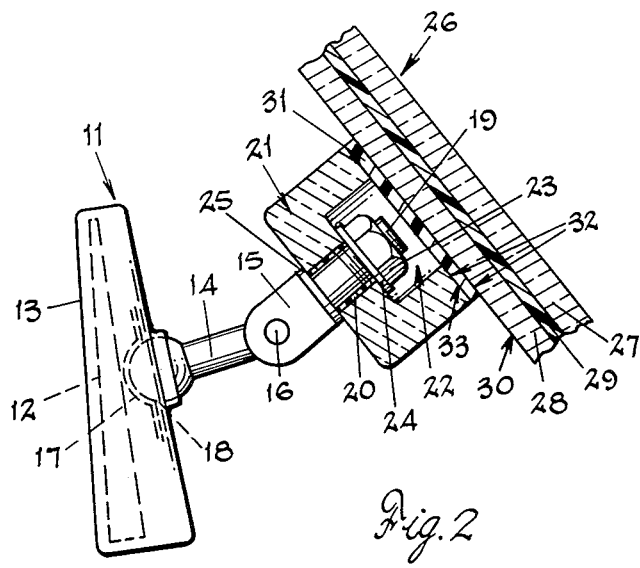

In the drawings, wherein like numerals are employed to designate like parts throughout the same:

FIG. 1 is a perspective view of the front end of an automobile showing a rear view mirror mounted on the windshield according to the present invention; and FIG. 2 is an enlarged vertical section of the rear view mirror mounted on the interior surface of the windshield taken substantially along line 2—2 of FIG. 1.

Referring now to the drawings, there is illustrated in FIG. 2 a mirror mounting embodying the present invention. Since the actual construction of the mirror itself does not form a part of this invention, only those portions of the mirror, which it is believed are necessary for a complete understanding of the present invention, have been illustrated and will be herein described.

With reference particularly to FIG. 1, there is shown a "cap" windshield A to the interior surface of which is mounted a rear view mirror unit 11. As seen in FIG. 2, the unit 11 includes a mirror element 12, mounted in a suitable case or housing 13. The mirror unit may be of any suitable type or design, i.e., that is a single or multiple position mirror.

The mirror unit 11 is carried by a support arm or stud 14 fastened at one end to a clevis 15 by locking pin 16 to allow for vertical adjustment of the mirror unit and provided at its opposite end with a ball 17 fitted within a socket 18 in the mirror case 13 to permit angular adjustment of the mirror unit relative to the arm 14. The clevis 15 has a threaded shank 19 passing through a bushing 20 of nylon or other suitable material that is fitted in an opening in a substantially solid mounting member or block 21. This block or mirror mounting member 21, as will be later described, may be formed of various materials but in a preferred embodiment, is made of glass. The base of the mounting member 21 is hollow as at 22 and a locking nut 23 and lock washer 24 are carried by shank 19 to fixedly secure the clevis 15 to member 21. A suitable washer 25 separates the member 21 from the clevis 15.

The mirror unit 11 above described is herein shown as being mounted to the inner surface of a laminated safety glass windshield 26 (FIG. 2) that includes two sheets of glass 27 and 28 and an interposed plastic layer 29 bonded to one another to provide a composite structure. The mounting of the mirror unit 11 is achieved by means of a layer 31 of plastic material, such as polyvinyl butyral resin, coated with a special plasticizer as will be later described. It is to be understood that the method herein provided is applicable for mounting in general any substantially solid member to a surface of any suitable support body, however, it will be described with particular reference to the mounting of a glass block for supporting a rear view mirror to an automobile windshield.

In order to mount the member or block 21, the layer 31, comprising a strip of polyvinyl butyral plastic having a composition of 100 parts by weight of polyvinyl butyral resin and from 7 to 50 parts by weight of a suitable plasticizer, is dipped into a phosphate ester plasticizer to form a film or coating on the contacting areas of each bonding surface 32 of the plastic layer. The coated plastic layer 31 is then placed between the surface 33 of member 21 (FIG. 2) and the surface 30 of the glass windshield 26 and by the application of pressure the member 21 can be secured to the windshield 26.

The two glass members 21 and 28 can be bonded to one another at room temperatures under only relatively light pressure, it being necessary to use only enough pressure at any temperature to insure the removal of any air bubbles present in the plasticizer coating or film on bonding surfaces 32 of the plastic layer 31. It is also desirable but not essential that when the layer 31 is dipped into the solvent plasticizer, that the excess plasticizer be removed from the bonding surfaces 32 of the layer either by shaking or by another suitable method. It has also been found desirable that the surface 30 of the glass windshield 26 and the surface 33 of the member 21 be cleaned prior to the above discussed mounting of member 21 so that they are substantially free of foreign substances.

While this process may be performed at room temperatures, it has been found that if the glass block or support member 21 is heated to a temperature as high as 300° F., and preferably between approximately 150° and 250° F., the time that it takes to assure a firm bonding of the member 21 to the glass windshield 26 is substantially reduced. For example, if the glass block 21 is heated, as indicated, and tri-2-ethylhexyl phosphate is used as a plasticizer to bond the plastic layer between and to the two members, i.e., member 21 and windshield 26, the bond will set in about fifteen seconds. Likewise, if tricresyl phosphate is employed the bond will set in about twenty seconds. A number of high boiling phosphate ester plasticizers have also proven satisfactory and these include 2-ethylhexyl diphenyl phosphate and phenyl dicresyl phosphate.

Aluminum or stainless steel can be adhered directly to the glass by the above process and therefore aluminum or metallic members 21 could be mounted in the same manner as hereinabove described. It is often desirable in this bonding of a material to a glass surface, to choose a material having a coefficient of expansion matched to that of the glass, so that the bond will resist natural temperature changes. It has been found that a stainless steel plate, approximately 1½ inches by 2 inches by 3/16 of an inch thick laminated to a glass windshield by this process can survive repeated exposure to —65 degrees. Glass blocks or members 21 substantially 1 inch by 2 inches by ½ inch thick, mounted by this process to a glass sheet, have performed satisfactorily at temperatures from —65° to 180° F.

Examples of suitable plastic layer materials that have also been used are 100 parts polyvinyl butyral plus 20 parts triethylene glycol dihexoate; 100 parts polyvinyl butyral plus 7 parts triethylene glycol dihexoate; 100 parts polyvinyl butyral plus 7 parts dibutyl sebacate; 100 parts polyvinyl butyral plus 7 parts dibutoxyethyl adipate; 100 parts polyvinyl butyral plus 40 parts dibutoxyethyl adipate; and 100 parts polyvinyl butyral plus 37 parts dibutyl sebacate.

Plastic materials as above noted of widely varying compositions may be used, and the aforementioned compositions are only intended to be examples of compositions that have been used and given satisfactory results and should not be interpreted as limiting the invention to any specific composition. However, it is additionally pointed out that satisfactory results have been achieved when the plastic layer initially contained no plasticizer. In any event, it is therefore seen that the specific composition of the layer material to be employed, as illustrated by the above examples, offers a means of controlling the final plasticizer content in the bonding layer.

An alternative method of mounting member 21 to windshield 26 would be to coat or apply the plasticizer to both the surface 30 of the windshield 26 and to the surface 33 of the member 21, rather than applying it to both bonding surfaces 32 of the layer 31. This film or coating could be applied to these surfaces, i.e. 30 and 33, by any suitable applicator. It is therefore seen, according to the present invention, that a coating or film of the plasticizer need only be applied so that it would be positioned between and in contact with both a surface of the plastic layer and a surface of any member to be bonded to the layer, that is between the surfaces to be joined.

A number of other variations in the above described process may be made. One such variation would encompass initially bag laminating a vinyl butyral plastic layer 31, under heat and pressure, directly to the surface 33 of the block or member 21 and subsequently attaching the assembly, thus formed, to the windshield surface, i.e. the surface 30, after wetting either the opposed exposed bonding surface 32 of the layer 31 or the surface 30 of the glass windshield 26 with a plasticizer as above described. It is noted that by heating the glass block the time for setting the bond will be reduced and this heating may be accomplished at any time after the plastic layer 31 has been joined to the block 21. The heating to an elevated temperature speeds the final bonding of the layer-block assembly to the windshield 26 but does not in any way affect the bond already made between the block 21 and the layer 31. Tensile adhesion tests indicate that bond strengths in the range of 1000 to 1200 p.s.i. are obtained by this method.

Additionally, if it is not desired to bag laminate the layer 31 to the block 21, the block 21 can be heated to between 150° and 250° F. and coated with one of the high boiling phosphate ester plasticizers so that a coextensive layer 31 of polyvinyl butyral, of any composition above discussed, may be bonded to the block 21 upon contact therewith by the process hereinbefore described. This layer-block assembly may be at this time adhered to the windshield, i.e. while the block is still heated to the elevated temperature, or the block assembly might be allowed to cool and subsequently reheated. If allowed to cool the layer-block combination can at any time be reheated to between 150° and 250° F., the exposed layer bonding surface 32 then coated with one of the above mentioned phosphate esters and the layer-block assembly affixed in a matter of seconds directly to a windshield or other surface. As was the case with the layer-block assembly formed by bag laminating, the original bond between block 21 and interlayer 31 would not be affected by the cooling and reheating.

It is therefore seen that a glass or metallic mirror mounting member or block 21 may be attached directly to the interior surface 30 of a glass windshield through the use of a polyvinyl butyral plastic layer and a high boiling phosphate ester plasticizer. Such nonvolatile solvent plasticizers are particularly desirable because of their resistance to shrinkage and because it has been found that highly volatile phosphate esters lead to shrinkage of the layer. These nonvolatile solvent plasticizers further seem to contribute outstanding weather stability to a polyvinyl butyral plastic layer and it is particularly pointed out that the durable bond, as above described, may be achieved through the use of alkyl or aryl, or mixed alkyl-aryl esters of ortho phosphoric acid which are solvents for vinyl butyral at room temperatures and which have a vapor pressure lower than 5 millimeters of mercury at 200° C. and a solubility in water of less than .01% by weight.

Thus is contemplated a solvent plasticizer laminating process by means of which a rear view mirror supporting plate or block, and most particularly one made of glass, may be laminated directly to the interior of an automobile windshield. Such a method of laminating will provide a firm bond and a firm adhesion between the two glass members that will be durable and resistant to car vibrations and also resistant to the normal variations of temperature and weather conditions.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

We claim:

1. A method of bonding a layer of polyvinyl butyral to a substantially solid member, including applying a coating consisting of a solvent plasticizer selected from the group consisting of alkyl, aryl and mixed alkyl-aryl esters of ortho phosphoric acid having a vapor pressure lower than 5 millimeters of mercury at 200° C. and a solubility in water of less than .01 percent by weight to at least one of the opposed surfaces of said member and said polyvinyl butyral layer, and while the said member is at a temperature within the range of approximately 150° F. to 300° F., subjecting the coating between the surfaces of said member and said layer of polyvinyl butyral to a pressure sufficient only to remove air bubbles from said coating to bond the said member and layer of polyvinyl butyral together.

2. A method of bonding a layer of polyvinyl butyral to a substantially solid member as defined in claim 1, wherein said plasticizer is 2-ethylhexyl diphenyl phosphate.

3. A method of bonding a substantially solid metal member to a glass sheet, including disposing a layer of polyvinyl butyral between the opposed surfaces of said metal member and said glass sheet, wetting at least one of the adjacent surfaces of the glass sheet and polyvinyl butyral layer and at least one of the adjacent surfaces of the metal member and the polyvinyl butyral layer with a substance consisting of a solvent plasticizer selected from the group consisting of alkyl, aryl and mixed alkyl-aryl esters of ortho phosphoric acid having a vapor pressure lower than 5 millimeters of mercury at 200° C. and a solubility in water of less than .01 percent by weight, and while at least one of the said metal member and said glass sheet is at a temperature in the range of approximately 150° F. to 300° F., exerting a pressure sufficient only to remove air bubbles from the solvent plasticizer coatings to establish a firm bond between said metal member and glass sheet through the intermediate layer of polyvinyl butyral.

References Cited by the Examiner

UNITED STATES PATENTS

| | | | |
|---|---|---|---|
| 2,117,321 | 5/1938 | Hill | 154—2.77 XR |
| 2,234,829 | 3/1941 | Neher et al. | 154—2.77 |
| 2,268,266 | 12/1941 | Ryan | 156—106 |
| 2,487,063 | 11/1949 | Marks | 154—2.77 XR |
| 2,526,728 | 10/1950 | Burk | 154—43 |
| 2,528,338 | 10/1950 | Cairns | 154—2.77 XR |
| 2,553,961 | 5/1951 | Dreyer | 154—2.77 XR |
| 2,694,689 | 11/1954 | Gamrath et al. | 260—30.6 |
| 2,725,319 | 11/1955 | Tarnopol | 156—106 |
| 2,728,703 | 12/1955 | Kierman et al. | |
| 2,784,171 | 3/1957 | Chadwick | 260—30.6 |
| 2,885,377 | 5/1959 | Knowles et al. | 260—30.6 |
| 2,912,400 | 11/1959 | Olson | 260—30.6 |

ALEXANDER WYMAN, *Primary Examiner.*

R. LEIBOWITZ, EARL M. BERGERT, CARL F. KRAFTT, *Examiners.*